United States Patent [19]
Ueda et al.

[11] Patent Number: 5,609,976
[45] Date of Patent: Mar. 11, 1997

[54] ALKALINE STORAGE BATTERY

[75] Inventors: Takao Ueda; Yoshihisa Takizawa, both of Itano-gun, Japan

[73] Assignee: Sanyo Electric Co., Ltd., Osaka, Japan

[21] Appl. No.: 529,642

[22] Filed: Sep. 18, 1995

[30] Foreign Application Priority Data

Oct. 7, 1994 [JP] Japan .................................. 6-244186

[51] Int. Cl.$^6$ ..................................... H01M 2/16
[52] U.S. Cl. .................... 429/254; 429/250; 429/142; 429/206
[58] Field of Search .................... 429/254, 250, 429/142, 206

[56] References Cited

U.S. PATENT DOCUMENTS

| | | | |
|---|---|---|---|
| 3,929,509 | 12/1975 | Taskier | 429/250 |
| 5,242,768 | 9/1993 | Nagatsuka et al. | 4/142 |
| 5,362,582 | 11/1994 | Chang et al. | 429/254 |
| 5,385,777 | 1/1995 | Hieuch et al. | 429/254 |
| 5,401,594 | 3/1995 | Schwöbel et al. | 429/142 |

FOREIGN PATENT DOCUMENTS

| | | |
|---|---|---|
| 3-257755 | 11/1991 | Japan . |
| 5-182654 | 7/1993 | Japan . |
| 7-29561 | 1/1995 | Japan . |

*Primary Examiner*—Donald R. Valentine
*Assistant Examiner*—Kishor Mayekar
*Attorney, Agent, or Firm*—Wenderoth, Lind & Ponac

[57] ABSTRACT

The alkaline storage battery comprises a positive electrode, a negative electrode, a separator, and alkaline electrolyte. The separator is a single layer of synthetic fiber non-woven fabric. Treating the separator to increase either the amount of fiber interconnection at the surface or the amount the fibers are broken apart at the surface or both improves separator strength without sacrificing permeability. This prevents internal short circuits, reduces internal pressure, and significantly improves battery lifetime.

51 Claims, 3 Drawing Sheets

200 μm

200 μm

200 μm

200 μm

ALKALINE STORAGE BATTERY

BACKGROUND OF THE INVENTION

This invention relates to an alkaline storage battery such as a nickel-hydrogen battery, a nickel-cadmium battery, and a nickel-zinc battery, and in particular this invention relates to an alkaline storage battery containing a separator having a unique structure.

In recent years portable electronic equipment represented by such devices as portable word processors, portable telephones, portable personal computers, and video cameras have had an increasing tendency to become light-weight and miniaturized. To advance this miniaturization of electronic equipment, a demand for a new level of battery miniaturization and performance has taken place.

Particularly, a strong demand has developed for a high battery capacity in typical alkaline storage batteries, such as nickel-hydrogen and nickel-cadmium batteries. A key issue revolves around increasing the energy density of the positive and negative electrode materials and at the same time reducing the separator thickness.

One simple method of reducing separator thickness is to decrease the weight of the separator per unit surface area. However, a simple reduction of separator weight per unit surface area with no other adjustments leads to a drastic reduction in the mechanical strength of the separator. This results in breaks in the separator during battery assembly when the positive and negative electrodes are wound with the separator between them. Even supposing that successful electrode winding is possible, micro-cracks developing in the positive and negative electrode plates lead to separator damage and numerous short circuits.

Japanese Non-examined Patent Publication No.3-257755 issued Nov. 18, 1991 recites one method of obtaining a separator with excellent ability to retain electrolytes. This disclosure describes a treatment with a high pressure water stream to break apart and interconnect composite segmented fibers of a non-woven fabric separator. The non-woven fabric separator is made up of two types of composite segmented fibers using resins with superior chemical resistance and resins having excellent hydrophilic properties.

This type of high pressure water treatment to break apart and interconnect composite segmented fibers of a non-woven fabric separator not only provides a separator with excellent ability to retain electrolytes, but also promises to improve the separator's mechanical strength. Specifically, by increasing the interconnections of fibers that make up the non-woven fabric in three-dimensions, bonding between fibers is expected to becomes stronger thereby improving mechanical strength.

However, when a non-woven fabric separator with increased fiber interconnection due to high pressure water treatment is used in an alkaline storage battery, the battery develops the problem of operating under abnormally high internal pressure. This is caused by decreased separator permeability due to strong retention of electrolyte within the fiber gaps of the nonwoven fabric with increased interconnection between fibers. When separator permeability is decreased, gas generated at the positive electrode cannot smoothly pass through the separator. Gas which does not quickly pass through the separator cannot be absorbed by the negative electrode and the internal pressure of the alkaline storage battery increases.

Another separator using composite segmented fibers is described in Japanese Non-examined Patent Publication No.5-182654 issued Jul. 23, 1993. This disclosure describes a three layered separator in which water stream interconnected non-woven fabric is bonded to both sides of melt-blow non-woven fabric to improve electrolyte retention without sacrificing mechanical strength.

However, it is difficult to make this three layered separator both strong and readily gas permeable. Insufficient strength results from the weakness of the core melt-blow non-woven fabric. In particular, since the separator structure is a laminate of three layers of non-woven fabric bonded together, reduced strength results because the core melt-blow non-woven fabric cannot be made sufficiently thick. Another reason for reduced separator strength is difficulty in achieving an ideal bond between the melt-blow and water stream interconnected non-woven fabrics. If the amount of bonding adhesive used to laminate the non-woven fabrics is increased, the bonding adhesive will close off gaps between fibers and thereby reduce separator permeability. Further, if the non-woven fabrics are sufficiently heat-welded together, the laminate becomes compressed, thereby reducing inter-fiber gaps and gas permeability. Consequently, this separator structure results in a reduction in gas permeability and an increase in internal battery pressure when the melt-blow and water stream treated non-woven fabrics are strongly bonded together. In addition, this separator structure results in a reduced separator strength when the gas permeability is improved. In other words, the properties of separator strength and gas permeability are in mutual opposition and improvement of both is extremely difficult. Finally, since the thin separator described in this disclosure is fabricated by bonding water stream interconnected non-woven fabric to melt-blow non-woven fabric, manufacture is extremely complex and it is difficult to achieve low cost, high quantity production low cost.

The present invention was developed to solve the above mentioned problems. It is thus a primary object of the present invention to provide a high capacity, long lifetime alkaline storage battery having a separator which can be manufactured inexpensively in quantity with both improved strength and permeability and which has reduced thickness without sacrificing electrolyte retention.

The above and further objects and features of the invention will more fully be apparent from the following detailed description with accompanying drawings.

SUMMARY OF THE INVENTION

The alkaline storage battery of the present invention comprises a positive electrode, a negative electrode, a separator, and alkaline electrolyte held within the positive and negative electrodes and the separator. The separator is constructed of synthetic resin fiber non-woven fabric which is a three-dimensional aggregate of composite segmented fibers interconnected at their crossing points.

The alkaline storage battery of the present invention has a non-woven fabric separator with single layer construction, not a laminate. The single layer non-woven fabric separator has composite segmented fibers with a greater degree of interconnection or a greater degree of segmentation at surface regions than in the interior.

In this patent application, the degree of interconnection of composite segmented fibers means the amount of three-dimensional inter-twining of separated fibers. The degree of segmentation means the amount that fibers are broken apart and separated.

BRIEF DESCRIPTION OF THE DRAWINGS

FIG. 6(a) is an enlarged view cross-section view from the surface, FIG. 6(b) is a cross-section view of a separator and FIG. 6(c) is an enlarged view of the cross-section view from the inside of the fiber, wherein 1 in the drawings represents the bonding fibers and 2 represents the unsegmented fibers.

DETAILED DESCRIPTION OF THE INVENTION

Figure 1:
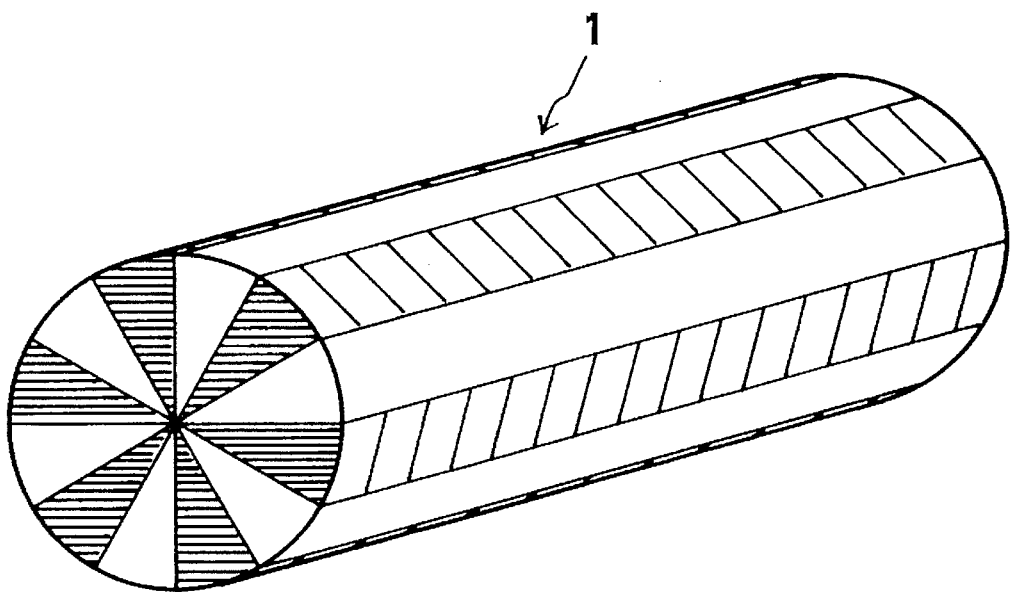
FIG. 1 is an oblique view of a composite segmented fiber used in the non-woven fabric separator of the present invention.

The alkaline storage battery comprises a positive electrode, a negative electrode, a separator insulating the positive electrode from the negative electrode, alkaline electrolyte held within the separator and the positive and negative electrodes, and an enclosing case. The separator is synthetic resin fiber non-woven fabric which is a three-dimensional aggregate of composite segmented fibers interconnected at fiber crossing points. The non-woven fabric separator is a single layer structure. The single layer non-woven fabric separator has composite segmented fibers with more interconnection or more segmentation at surface regions than in the interior. The degree of interconnection or segmentation can be easily adjusted, for example, by treatment time in the water stream method which performs composite segmented fiber interconnection and segmentation with spray from a high pressure water stream. If the water stream treatment time is long, separator fibers become sufficiently interconnected and segmented through to the interior of the separator. This results in a high degree of interconnection and segmentation through the entire separator. If the water stream treatment time is shorter than that resulting in uniform interconnection and segmentation throughout the separator, more fibers can be interconnected and segmented at surface regions than in the interior of the separator. In the water stream method, fiber interconnection and segmentation varies with stream spray pressure and spray environment. For example, if the water spray pressure is high, fibers through to the separator interior quickly become more interconnected and segmented. If the water spray pressure is low, more time is required before fibers in the separator interior interconnect and segment. Similarly, if the source of the high pressure water spray is located further from the separator, more time is required for interconnection and segmentation.

Consequently, to make separator surface region fibers more interconnected and segmented than interior fibers, water stream pressure and other conditions are adjusted to their optimum values. However, the method of interconnecting or segmenting non-woven fabric separator fibers in the alkaline storage battery of this invention is not specified or restricted. By specifying the structure of separator fiber interconnection and segmentation for the alkaline storage battery of the present invention, the exceptional characteristics compared to prior art are realized. Any presently applied or future method of interconnecting or segmenting non-woven fabric separator composite segmented fibers can be used for separator treatment.

In the alkaline storage battery of the present invention, it is desirable for the amount of alkaline electrolyte retained within the separator to be within the following range. The amount of alkaline electrolyte is specified by the relation $$0.3 \leq X/(X+Y) \leq 0.5$$

where X is the weight of alkaline electrolyte retained within the separator and Y is the separator weight. If the amount of alkaline electrolyte is below the range specified by the above relation, battery performance drops rapidly as charge-discharge cycles are repeated. This is because the positive electrode expands and absorbs electrolyte as charge-discharge cycles are repeated reducing the amount of electrolyte within the separator and increasing internal battery resistance. On the other hand, if the amount of alkaline electrolyte is above the specified range, the permeability of the separator drops and internal battery pressure becomes abnormally high.

The interconnection and segmentation of alkaline storage battery separator fibers is not uniform throughout the separator. Composite segmented fibers at the separator interior are less interconnected and segmented than those at the surface providing moderate sized gaps between fibers. These gaps improve separator permeability.

Reducing the interconnection and segmentation of composite segmented fibers throughout the entire separator reduces separator strength. To avoid this drawback and increase separator strength, the alkaline storage battery separator of this invention provides greater fiber interconnection and segmentation at surface regions. This reinforces the separator at the surface regions. A separator with increased surface strength has stronger contact surfaces with the positive and negative electrodes to effectively prevent electrode short circuits. Consequently, during battery assembly when the positive and negative electrodes are wound with the separator between them, damage to the separator due to micro-cracks developing in the electrode plates is suppressed and internal battery short circuits are effectively prevented.

The two mutually opposing properties of separator strength and permeability can both be improved by the very simple separator structure of the alkaline storage battery of this invention wherein non-woven fiber interconnection and segmentation varies from the surface to the interior of the separator. This simple non-woven fabric separator also has the characteristic that it can be inexpensively manufactured in quantity and markedly improve battery performance.

Further, by including an alkaline electrolyte of weight X with a separator material weight Y such that the relation $0.3 \leq X/(X+Y) \leq 0.5$ holds, the battery the life is prolonged and internal pressure rise is effectively avoided.

Embodiments of the present invention and comparison examples are presented in the following. Six types of separators (a, b, c, d, e, and f) are fabricated as follows for use in alkaline storage batteries.

① separator a

This separator has more interconnection of composite segmented fibers in surface regions than in the interior. (This separator is used in alkaline storage battery embodiment A of the present invention.)

Figure 2:
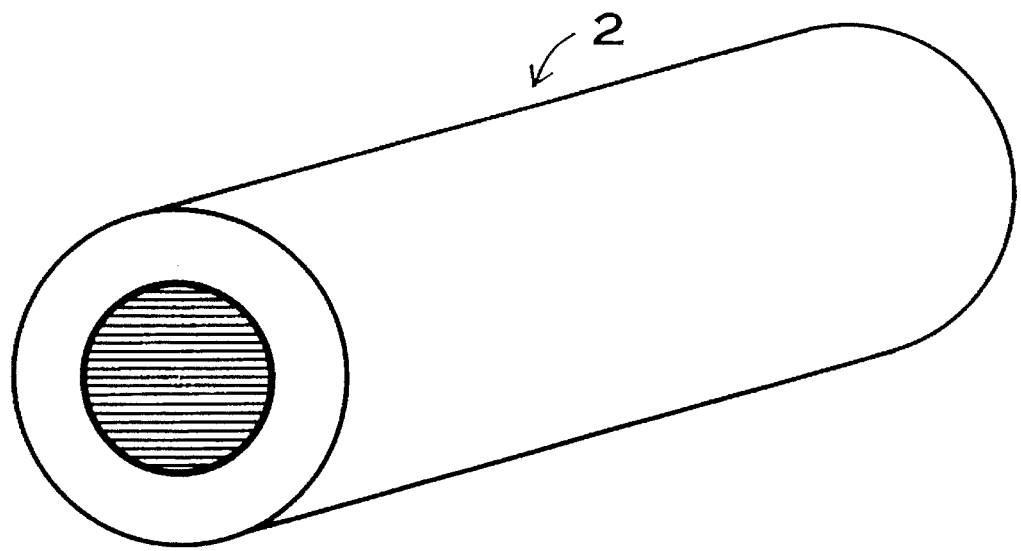
FIG. 2 is an oblique view showing an embodiment of a core and sheath structure bonding fiber which is mixed with the composite segmented fibers of the non-woven fabric separator of the present invention.

Two types of fibers are mixed to form the non-woven fabric. Turning to FIG. 1, two types of synthetic polymer resins polypropylene and polyethylene are arranged in radial segments to make composite segmented fibers 1. Turning to FIG. 2, a core of polypropylene is surrounded by polyethylene on the surface of bonding fiber 2 which has a core-sheath structure. These two fiber types are collected into a three-dimensional sheet by the usual drying method and heated to melt the low melting point polyethylene polymer resin welding fibers together at their crossing points to produce a non-woven fabric. Note that the composite segmented fiber shown in FIG. 1 has different polymer resins arranged in different radial segments. However, the composite segmented fibers used in the separator of the alkaline storage battery of the present invention do not necessarily have different polymer resins arranged in radial segments as shown in FIG. 1. For example, although not illustrated, different polymer resin types may also be laminated in parallel planes and formed into a fiber shape.

The composite segmented fibers have an average radius of 20 μm in the unsegmented state. However, after segmentation the composite segmented fibers have an average radius of 4 μm. Bonding fibers with an average radius of 15 μm are used. However, average composite segmented fiber radius can be from 10 μm to 40 μm, and average bonding fiber radius can be from 5 μm to 25 μm. The mixture ratio of composite segmented fibers to bonding fibers is 100 to 10 by weight. For example, for 100 parts by weight of composite segmented fibers, the bonding fibers can be mixed from 2 to 30 parts by weight, but preferably from 3 to 25 parts by weight, and more preferably within the range from 5 to 20 parts by weight. Bonding fibers have surfaces which melt when heated to perform the function of efficiently adhering the composite segmented fibers at crossing points. Consequently, non-woven fabric, which includes bonding fibers, has the characteristic that fiber interconnection is stronger.

Further, non-woven fabric which includes bonding fibers can use composite segmented fibers made up of polymer resins which have high melting points. This is because composite segmented fiber crossing points are heat welded together by bonding fibers. For example, nylon-6, nylon-6,6 or combinations of nylon-6 and polypropylene can be used for composite segmented fibers heat welded with low melting point bonding fibers. However, in the alkaline storage battery separator of the present invention, fibers can be welded together by melting composite segmented fiber polymer resins. Therefore, separator non-woven fabric can also be made using polymer resin composite segmented fibers that can be heat welded together without having to add bonding fibers.

Figure 3:
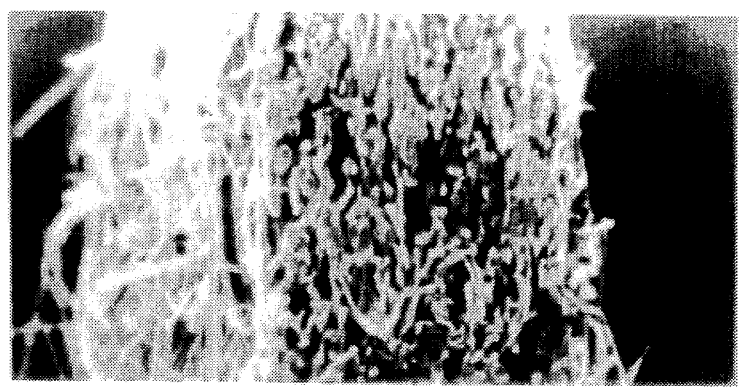
FIG. 3 is an electron microscope photograph showing the cross-sectional structure of a non-woven fabric separator used in an alkaline storage battery of the present invention with a greater degree of interconnection of composite segmented fibers at the surface region than in the interior.

The non-woven fabric made as described above has its entire top and bottom surfaces exposed to three high pressure water sprayings with approximately 25 kg/cm² of pressure. This intertwines and connects more composite segmented fibers in three-dimensions at surface regions than in the interior resulting in a non-woven fabric separator with more fiber interconnection at the surface than in the interior. The high pressure water stream is sprayed from a nozzle at the non-woven fabric. The nozzle is rastered over the area of the non-woven fabric to spray its entire surface area with high pressure water. The high pressure spraying can be repeated from 2 to 5 times. The electron microscope photograph of FIG. 3 shows the cross-sectional structure of a non-woven fabric separator with this type of interconnection treatment. The resulting non-woven fabric separator has a mass per unit area of 60 g/m² and a thickness of 0.15 mm.

② separator b

This separator has more segmentation of composite segmented fibers in surface regions than in the interior. (This separator is used in alkaline storage battery embodiment B of the present invention.)

The same fibers as those used for separator a are used to make non-woven fabric by applying the drying method to an aggregate of fibers. In this case, the entire top and bottom surfaces of the non-woven fabric are sprayed three times with a high pressure water stream of approximately 80 kg/cm² pressure. This breaks apart many composite segmented fibers in the surface regions resulting in a non-woven fabric separator with more fiber segmentation at the surface than in the interior. High pressure water from a nozzle is rastered over the non-woven fabric to spray the entire area in the same manner as described for the previous interconnection treatment. Similarly, the high pressure spraying can be repeated from 2 to 5 times. The non-woven fabric separator produced in this fashion has a mass per unit area of 60 g/m² and a thickness of 0.15 mm. Spraying the non-woven fabric with the extremely high pressure water stream of 80 kg/cm² effectively segments the composite segmented fibers more than interconnecting them. This results in finely separated fibers.

③ separator c

This separator has more interconnection and more segmentation of composite segmented fibers in surface regions than in the interior. (This separator is used in alkaline storage battery embodiment C of the present invention.)

Figure 4:
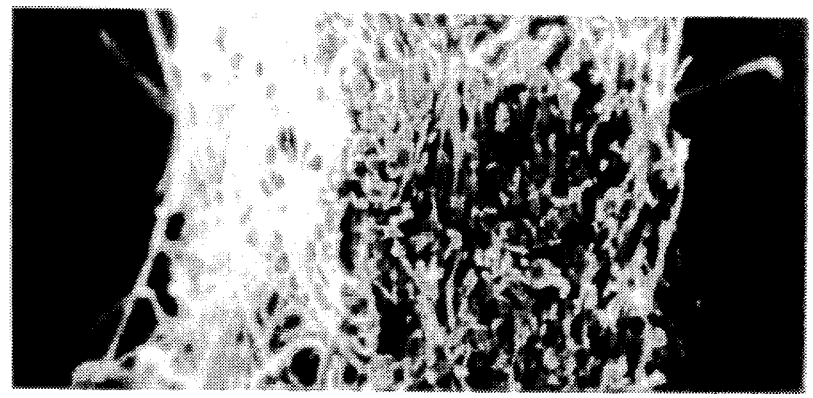
FIG. 4 is an electron microscope photograph showing the cross-sectional structure of a non-woven fabric separator used in an alkaline storage battery of the present invention with a greater degree of interconnection and a greater degree of segmentation of composite segmented fibers at the surface region than in the interior.

Separator a produced by method ① and sprayed with approximately 25 kg/cm² of high pressure water is further sprayed three times on both sides with 80 kg/cm² of high pressure water. Again, the high pressure spraying can be repeated from 2 to 5 times. The high pressure water stream sprayed at the surfaces of the non-woven fabric further segments composite segmented fibers in the surface regions resulting in more segmentation at the surface than in the interior. The electron microscope photograph of FIG. 4 shows the cross-sectional structure of non-woven fabric with this type of segmentation treatment. The non-woven fabric separator shown in FIG. 4 has composite segmented fibers with more interconnection and more segmentation in surface regions than in the interior. This non-woven fabric separator also has a mass per unit area of 60 g/m² and a thickness of 0.15 mm.

④ separator d

This separator has no interconnection or segmentation treatment of composite segmented fibers on the surface or in the interior. (This separator is used in alkaline storage battery comparison example D.)

Figure 5:
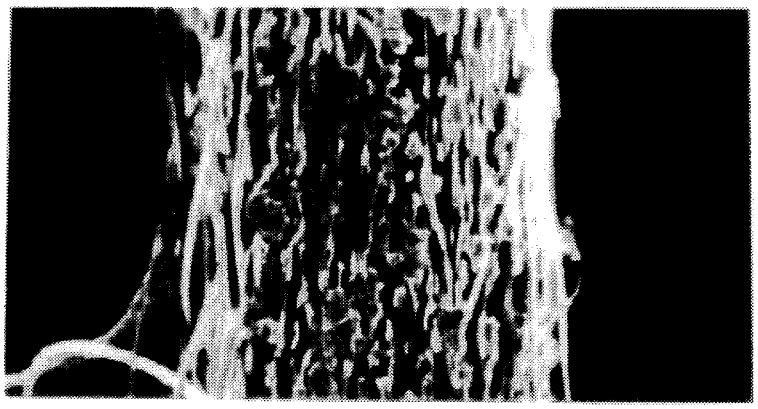
FIG. 5 is an electron microscope photograph showing the cross-sectional structure of a non-woven fabric separator used in an alkaline storage battery with no interconnection or segmentation treatment of the composite segmented fibers.
Figure 6A:
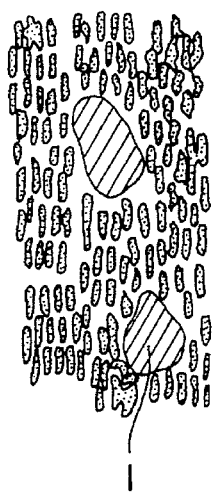
FIGS. 6(a)–6(c) illustrate an embodiment in which the degree of segmentation is greater at surface regions than in the interior of the fiber.
Figure 6B:
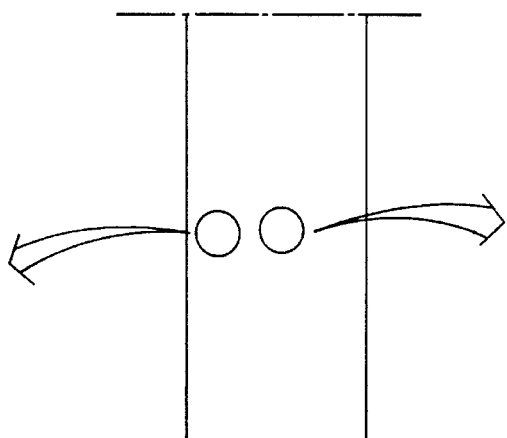
Figure 6C:
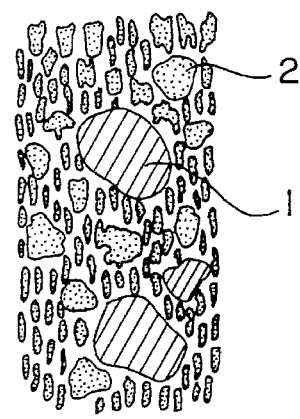

The same composite segmented fibers and bonding fibers used by method ① for separator a are mixed and made into a non-woven fabric separator by the drying method. Since this non-woven fabric separator is treated with a high pressure water stream, the composite segmented fibers receive no interconnection or segmentation processing as shown by the electron microscope photograph of FIG. 5.

⑤ separator e

This separator has uniform interconnection and segmentation of composite segmented fibers throughout the separator. (This separator is used in alkaline storage battery comparison example E.)

The non-woven fabric separator c produced by method ③ is further sprayed over ten times on both sides with 80 kg/cm² of high pressure water. This produces a separator with uniform three-dimensional intertwining and uniform segmentation of composite segmented fibers through the thickness of the separator. This separator also has a mass per unit area of 60 g/m² and a thickness of 0.15 mm. ⑥ separator f This non-woven fabric separator is a three layer structure with water stream interconnected non-woven fabric bonded to both sides of melt-blow non-woven fabric. (This separator is used in alkaline storage battery comparison example F.)

This separator is melt-blow non-woven fabric and water stream interconnected non-woven fabric of the same thickness laminated together using adhesive bonding to make a separator with a mass per unit area of 60 g/m² and an overall thickness of 0.15 mm. The melt-blow non-woven fabric is an aggregate of fibers with an average radius of 3 μm to 9 μm. The water stream interconnected non-woven fabric has an average fiber radius of 20 μm and its top and bottom surfaces are sprayed with 80 kg/cm² high pressure water to produce uniform interconnection and segmentation of the entire body of composite segmented fibers. In the water stream interconnected non-woven fabric 10 parts by weight of bonding fibers are mixed with 100 parts by weight of composite segmented fibers.

Separators a through f made by the methods described above are used in the alkaline storage batteries of the present invention A, B, and C and in the comparison example alkaline storage batteries D, E, and F. Separators a through f respectively are used to make alkaline storage batteries A through F in the following manner.

A sintered nickel electrode is used for the positive electrode and a hydrogen absorbing electrode is used for the negative electrode of each alkaline storage battery. Spiral electrode units are formed by winding each of the previously described separators a through f between a positive and negative electrode plate. Each spiral electrode unit is inserted into a battery case which also serves as the negative electrode terminal and an alkaline electrolyte which is a 30% by weight aqueous solution of potassium hydroxide is added. A capping unit which combines the functions of positive electrode terminal and safety valve is used to seal the battery via an insulating gasket. This assembly process produces alkaline storage batteries A, B, and C of the present invention with 1 Ah of capacity and comparison example batteries D, E, and F. The amount of alkaline electrolyte included in these batteries satisfies the relation $X/(X+Y)=0.4$ where X is the weight of electrolyte retained within the separator and Y is the separator weight.

To determine how battery performance varies with the amount of alkaline electrolyte in the separator, prototype alkaline storage batteries G, H, I, and J were also made as follows. The same non-woven fabric separator a produced by method ① above was used in these batteries and except for the change in the amount of alkaline electrolyte, these batteries are made in the same manner as alkaline storage battery A. Batteries G and H of the present invention and comparison example batteries I and J were made with the following amounts of alkaline electrolyte.

alkaline storage battery embodiment G: $X/(X+Y)=0.3$ alkaline storage battery embodiment H: $X/(X+Y)=0.5$ comparison example alkaline storage battery I: $X/(X+Y)=0.2$ comparison example alkaline storage battery J: $X/(X+Y)=0.6$ The characteristics of all the alkaline storage battery prototypes made as described above were measured by the following methods.

(1) Experiment 1: Separator Strength Measurement

The tearing strength of the separators used in the batteries of the present invention and comparison example batteries was evaluated and measured as follows. A 5 cm cut is made at the center of, and perpendicular to the short side of a 5 cm×10 cm separator test sample. Tensile strength test equipment with a clamp wider than 5 cm is used to pull apart the test sample with 5 cm between clamping points. Sample stretching speed is 30 cm per minute and the maximum load in grams at the tearing point is determined to three significant figures. The average value of the maximum load at the tearing point is given in Table 1 for each of the prototype batteries.

(2) Experiment 2: Measurement of the Rate of Internal Short Circuiting

The number of short circuits produced during battery assembly when the positive and negative electrode plates were wound with the separator between them was compared by a relative value with the number of shorts for comparison battery D taken to be 1.

(3) Experiment 3: Internal Pressure Measurement

After assembly, battery charge and discharge is performed five times under conditions 1 listed below. A hole is then opened in the bottom of the battery case and a pressure sensor installed. Battery charge is then performed under conditions 2 and internal pressure is measured at the point where the battery voltage drops 10 mV from the peak charging voltage.

conditions 1
charge: 100 mA×16 hrs
pause: 1 hr
discharge: 200 mA (discharge until battery voltage reaches 1.0 V)
pause: 1 hr
repetitions: 5 conditions 2
charge: 1 A (charge until battery voltage drops 10 mV from the peak value: $-\Delta V=10$ mV)

(4) Experiment 4: Cycle Lifetime Measurement

After assembly, five charge-discharge cycles are performed under the same conditions 1 of experiment (3). Charge-discharge cycles are then repeated under conditions 3 below until battery capacity reaches 60% of its initial value. The number of charge-discharge cycles performed when battery capacity reaches 60% of its initial value is the cycle lifetime.

conditions 3
charge: 1A ($-\Delta V=10$ mV)
pause: 1 hr
discharge: 1A (discharge until battery voltage reaches 1.0 V)
pause: 1 hr Results of the above measurements on batteries of the present invention and comparison batteries show that present invention batteries have the following exceptional characteristics. Refer to Table 1 which summarizes these results.

[1] results of experiment 1: separator strength measurement

Separators a, b, and c which have more fiber interconnection or segmentation at surface regions than in the interior and separator e which was treated to obtain uniform fiber interconnection and segmentation throughout show substantial improvement in strength compared to separator d which received no interconnection or segmentation treatment. It is believed that mechanical strength is improved by increasing the number of connection points between fibers. Thus separator mechanical strength is improved by additional interconnection or segmentation and further interconnection.

[2] results of experiment 2: measurement of the rate of internal short circuiting Results correspond to separator strength determined by experiment 1. Clearly, alkaline storage batteries with strong separators have a greatly reduced rate of internal short circuiting. Specifically, alkaline storage batteries A, B, and C of the present invention which contain separators a, b, and c have a much lower rate of internal short circuiting than comparison battery D containing separator d. Comparison battery E also has a low rate of internal short circuiting, but since the permeability of this battery's separator is poor, the drawback of abnormal internal pressure rise cannot be avoided.

[3] results of experiment 3: internal pressure measurement

The internal pressure of comparison batteries E, F, and J was much greater than that of batteries A, B, and C of the present invention. Comparison example J is an alkaline storage battery with the same separator a as battery A of the present invention. However, the amount of alkaline electrolyte retained in the separator of battery J is greater. This reduces separator permeability and gas generated at the positive electrode is not quickly absorbed by the negative electrode resulting in abnormally high internal pressure.

Separator e of comparison battery E has composite segmented fibers with a large amount of interconnection and segmentation which is uniform through to the interior. Alkaline electrolyte retained in the separator uniformly closes off gaps in the separator reducing permeability and increasing internal pressure. Further, comparison battery F contains a separator with a laminated structure and, therefore, there are fewer separator gaps reducing permeability and increasing internal pressure.

Comparing all the prototype batteries, comparison battery I has lower internal pressure than batteries A, B, and C of the present invention. Comparison battery I retains a small amount of alkaline electrolyte X such that $X/(X+Y)=0.2$. This results in very high separator permeability and oxygen gas absorption is faster than for the batteries of the present invention. However, since the quantity of alkaline electrolyte in comparison battery I is low, it has the drawback that cycle lifetime is short.

[4] results of experiment 4: cycle lifetime measurement

The cycle lifetimes of batteries A, B, C, G, and H of the present invention were much better than those of comparison batteries D, E, F, I, and J. Comparison battery D had a high rate of internal short circuiting, and it is believed that charge-discharge repetition caused short circuiting to decrease battery capacity early. Comparison battery E had the lowest rate of internal short circuiting, but its internal pressure was higher than that of the batteries of the present invention. It is believed that internal pressure rise caused gradual weight loss from the beginning of charge-discharge cycling resulting in early battery capacity loss. Similarly comparison batteries F and J had high internal pressure also resulting in early battery capacity loss. Comparison battery I showed little increase in internal pressure, but its separator retained only a small amount of alkaline electrolyte X such that $X/(X+Y)=0.2$. It is believed that internal resistance increased due to the drying up of electrolyte with charge-discharge repetitions resulting in early battery capacity loss.

TABLE I

|  | separator | separator electrolyte quantity [X/(X + Y)] | separator strength [g] | internal short circuit rate [%] | internal pressure [kg/cm$^2$] | cycle lifetime [cycles] |
| --- | --- | --- | --- | --- | --- | --- |
| battery A of this invention | a | 0.4 | 326 | 0.12 | 5.3 | 850 |
| battery B of this invention | b | 0.4 | 395 | 0.10 | 5.2 | 775 |
| battery C of this invention | c | 0.4 | 412 | 0.09 | 6.7 | 725 |
| comparison battery D | d | 0.4 | 112 | 1.00 | 5.2 | 350 |
| comparison battery E | e | 0.4 | 454 | 0.08 | 9.3 | 425 |
| comparison battery F | f | 0.4 | 250 | 0.47 | 11.5 | 375 |
| battery G of this invention | a | 0.3 | 326 | 0.12 | 4.1 | 600 |
| battery H of this invention | a | 0.5 | 326 | 0.12 | 7.5 | 700 |
| comparison battery I | a | 0.2 | 326 | 0.12 | 3.2 | 400 |
| comparison battery J | a | 0.6 | 326 | 0.12 | 10.2 | 400 |

In the above alkaline storage batteries, polypropylene/polyethylene was used for separator composite segmented fibers. It is also possible to use nylon-6/nylon-6,6, nylon-6/polypropylene, nylon-6/polyethylene, polypropylene/polyethylene terephthalate, and polypropylene/ethylene vinyl alcohol copolymers.

Further, although hydrophilic treatment of the separator of the present invention was not mentioned, it is needless to say that coating the separator surfaces with a surfactant or exposing the surfaces to gas mixtures of primary reaction fluorine and secondary reaction oxygen and sulfurous acid gas is effective in improving hydrophilic properties.

Still further, high pressure water spray treatment was used as the method interconnecting and segmenting fibers at the surface of non-woven fabric separators. The present invention does not limit non-woven fabric separator fiber interconnection and segmentation treatment to that discussed previously. For example, a needle-punch method which uses barbed needles to catch on fibers at the non-woven fabric surface regions can be adopted as an interconnection treatment. Also, an ultrasonic method where the non-woven fabric is immersed in water and its surfaces exposed to ultrasonic waves can be used as a segmentation treatment.

Still further, the processing steps for the separator of the alkaline storage battery of the present invention are not restricted. The non-woven fabric separator can undergo interconnection or segmentation treatments after fibers are collected into a three-dimensional solid and fiber crossing points heat welded together. However, interconnection or segmentation treatments of the non-woven fabric fibers can also be completed prior to heat welding fibers together at crossing points.

Finally, the degree of interconnection or segmentation due to any treatment depends on separator fiber gap size, thickness, and type of fibers. In the high pressure water treatment, the degree of interconnection or segmentation can be controlled by water pressure, the water stream orifice size, the distance from the orifice to the sample, and the raster speed of the sample.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. An alkaline storage battery comprising:
   (1) a positive electrode
   (2) a negative electrode in opposition to the positive electrode;
   (3) an alkaline electrolyte retained within a separator; and
   (4) said separator disposed between the positive electrode and negative electrode
      wherein the separator is a synthetic resin fiber non-woven fabric which is a three-dimensional aggregate of composite segmented fibers interconnected at fiber crossing points, said non-woven fabric having a single layer structure, and wherein a degree of interconnection of composite segmented fibers at surface regions of the single layer of the non-woven fabric is greater than a degree of interconnection in an interior thereof.

2. An alkaline storage battery as recited in claim 1 wherein the composite segmented fibers are formed from two types of polymer resins arranged in radials.

3. An alkaline storage battery as recited in claim 2 wherein the composite segmented fibers are formed from two types of polymer resins, polypropylene and polyethylene, arranged in radials.

4. An alkaline storage battery as recited in claim 2 wherein the composite segmented fibers are formed from two types of polymer resins, nylon-6 and nylon-6,6, arranged in radials.

5. An alkaline storage battery as recited in claim 2 wherein the composite segmented fibers are formed from two types of polymer resins, nylon-6 and polypropylene, arranged in radials.

6. An alkaline storage battery as recited in claim 1 wherein the composite segmented fibers have an average radius of 10 μm to 40 μm.

7. An alkaline storage battery as recited in claim 1 characterized in that the separator retains the alkaline electrolyte, and a weight of alkaline electrolyte retained in the separator satisfies the relation $$0.3 \leq X/(X+Y) \leq 0.5,$$

wherein X is the weight of the alkaline electrolyte and Y is the weight of the separator.

8. An alkaline storage battery as recited in claim 1 wherein the separator is coated with a surfactant.

9. An alkaline storage battery as recited in claim 1 wherein the separator is hydrophilic.

10. An alkaline storage battery comprising:
    (1) a positive electrode;
    (2) a negative electrode in opposition to the positive electrode;
    (3) an alkaline electrolyte retained within a separator; and
    (4) said separator disposed between the positive electrode and negative electrode
       wherein the separator is a synthetic resin fiber non-woven fabric which is a three-dimensional aggregate of composite segmented fibers and bonding fibers interconnected at fiber crossing points, said non-woven fabric having a single layer structure, and wherein a degree of interconnection of composite segmented fibers at surface regions of the single layer of the non-woven fabric is greater than a degree of interconnection in an interior thereof.

11. An alkaline storage battery as recited in claim 10 wherein the bonding fibers are formed in a core-sheath structure with a polypropylene core and a polyethylene sheath.

12. An alkaline storage battery as recited in claim 11 wherein the fabric has a mixing ratio of 5 to 20 parts by weight of bonding fibers to 100 parts by weight of composite segmented fibers.

13. An alkaline storage battery as recited in claim 10 wherein the bonding fibers have an average radius of 5 μm to 25 μm.

14. An alkaline storage battery as recited in claim 10 wherein the fabric has a mixing ratio of 2 to 30 parts by weight of bonding fibers to 100 parts by weight of composite segmented fibers.

15. An alkaline storage battery as recited in claim 10 wherein the fabric has a mixing ratio of 3 to 25 parts by weight of bonding fibers to 100 parts by weight of composite segmented fibers.

16. An alkaline storage battery as recited in claim 10 characterized in that the separator retains the alkaline electrolyte, and a weight of alkaline electrolyte X retained in the separator of weight Y satisfies the relation $$0.3 \leq X/(X+Y) \leq 0.5$$

17. An alkaline storage battery as recited in claim 10 wherein the separator is coated with a surfactant.

18. An alkaline storage battery as recited in claim 10 wherein the separator is hydrophilic.

19. An alkaline storage battery comprising:
    (1) a positive electrode;
    (2) a negative electrode in opposition to the positive electrode;
    (3) an alkaline electrolyte retained within a separator; and
    (4) said separator disposed between the positive electrode and negative electrode
        wherein the separator is a synthetic resin fiber non-woven fabric which is a three-dimensional aggregate of composite segmented fibers interconnected at fiber crossing points, said non-woven fabric having a single layer structure, and wherein a degree of segmentation of composite segmented fibers at surface regions of the single layer of the non-woven fabric is greater than a degree of segmentation in an interior thereof.

20. An alkaline storage battery as recited in claim 19 wherein the composite segmented fibers are formed from two types of polymer resins arranged in radials.

21. An alkaline storage battery as recited in claim 20 wherein the composite segmented fibers are formed from two types of polymer resins, polypropylene and polyethylene, arranged in radials.

22. An alkaline storage battery as recited in claim 20 wherein the composite segmented fibers are formed from two types of polymer resins, nylon-6 and nylon-6,6, arranged in radials.

23. An alkaline storage battery as recited in claim 20 wherein the composite segmented fibers are formed from two types of polymer resins, nylon-6 and polypropylene, arranged in radials.

24. An alkaline storage battery as recited in claim 19 wherein the composite segmented fibers have an average radius of 10 μm to 40 μm.

25. An alkaline storage battery as recited in claim 19 characterized in that the separator retains the alkaline electrolyte, and a weight of alkaline electrolyte retained in the separator satisfies the relation $$0.3 \leq X/(X+Y) \leq 0.5,$$

wherein X is the weight of the alkaline electrolyte and Y is the weight of the separator.

26. An alkaline storage battery as recited in claim 19 wherein the separator is coated with a surfactant.

27. An alkaline storage battery as recited in claim 19 wherein the separator is hydrophilic.

28. An alkaline storage battery comprising:
    (1) a positive electrode;
    (2) a negative electrode in opposition to the positive electrode;
    (3) an alkaline electrolyte retained within a separator; and
    (4) said separator disposed between the positive electrode and negative electrode
        wherein the separator is a synthetic resin fiber non-woven fabric which is a three-dimensional aggregate of composite segmented fibers and bonding fibers interconnected at fiber crossing points, said non-woven fabric having a single layer structure, and wherein a degree of segmentation of composite segmented fibers at surface regions of the single layer of the non-woven fabric is greater than a degree of segmentation in an interior thereof.

29. An alkaline storage battery as recited in claim 28 wherein the bonding fibers are formed in a core-sheath structure with a polypropylene core and a polyethylene sheath.

30. An alkaline storage battery as recited in claim 28 wherein the bonding fibers have an average radius of 5 μm to 25 μm.

31. An alkaline storage battery as recited in claim 28 wherein the fabric has a mixing ratio of 2 to 30 parts by weight of bonding fibers to 100 parts by weight of composite segmented fibers.

32. An alkaline storage battery as recited in claim 31 wherein the fabric has a mixing ratio of 3 to 25 parts by weight of bonding fibers to 100 parts by weight of composite segmented fibers.

33. An alkaline storage battery as recited in claim 31 wherein the fabric has a mixing ratio of 5 to 20 parts by weight of bonding fibers to 100 parts by weight of composite segmented fibers.

34. An alkaline storage battery as recited in claim 28 characterized in that the separator retains the alkaline electrolyte, and a weight of alkaline electrolyte retained in the separator satisfies the relation $$0.3 \leq X/(X+Y) \leq 0.5,$$

wherein X is the weight of the alkaline electrolyte and Y is the weight of the separator.

35. An alkaline storage battery as recited in claim 28 wherein the separator is coated with a surfactant.

36. An alkaline storage battery as recited in claim 28 wherein the separator is hydrophilic.

37. An alkaline storage battery comprising:
    (1) a positive electrode;
    (2) a negative electrode in opposition to the positive electrode;
    (3) an alkaline electrolyte retained within a separator; and
    (4) said separator disposed between the positive electrode and negative electrode
        wherein the separator is a synthetic resin fiber non-woven fabric which is a three-dimensional aggregate of composite segmented fibers interconnected at fiber crossing points, said non-woven fabric having a single layer structure, and wherein a degree of interconnection and segmentation of composite segmented fibers at surface regions of the single layer of the non-woven fabric is greater than a degree of interconnection and segmentation in an interior thereof.

38. An alkaline storage battery as recited in claim 37 wherein the composite segmented fibers are formed from two types of polymer resins arranged in radials.

39. An alkaline storage battery as recited in claim 38 wherein the composite segmented fibers are formed from two types of polymer resins, polypropylene and polyethylene, arranged in radials.

40. An alkaline storage battery as recited in claim 38 wherein the composite segmented fibers are formed from two types of polymer resins, nylon-6 and nylon-6,6, arranged in radials.

41. An alkaline storage battery as recited in claim 38 wherein the composite segmented fibers are formed from two types of polymer resins, nylon-6 and polypropylene, arranged in radials.

42. An alkaline storage battery as recited in claim 37 wherein the composite segmented fibers have an average radius of 10 μm to 40 μm.

43. An alkaline storage battery as recited in claim 37 characterized in that the separator retains the alkaline electrolyte, and a weight of alkaline electrolyte retained in the separator satisfies the relation $$0.3 \leq X(X+Y) \leq 0.5,$$

wherein X is the weight of the alkaline electrolyte and Y is the weight of the separator.

44. An alkaline storage battery as recited in claim 37 wherein the separator is coated with a surfactant.

45. An alkaline storage battery as recited in claim 37 wherein the separator is hydrophilic.

46. An alkaline storage battery comprising:
(1) a positive electrode;
(2) a negative electrode in opposition to the positive electrode;
(3) an alkaline electrolyte retained within a separator; and
(4) said separator disposed between the positive electrode and negative electrode
    wherein the separator is a synthetic resin fiber non-woven fabric which is a three-dimensional aggregate of composite segmented fibers and bonding fibers interconnected at fiber crossing points, said non-woven fabric having a single layer structure, and wherein a degree of interconnection and segmentation of composite segmented fibers at surface regions of the single layer of the non-woven fabric is greater than a degree of interconnection and segmentation in an interior thereof.

47. An alkaline storage battery as recited in claim 46 wherein the bonding fibers are formed in a core-sheath structure with a polypropylene core and a polyethylene sheath.

48. An alkaline storage battery as recited in claim 46 wherein the bonding fibers have an average radius of 5 μm to 25 μm.

49. An alkaline storage battery as recited in claim 46 wherein the fabric has a mixing ratio of 2 to 30 parts by weight of bonding fibers to 100 parts by weight of composite segmented fibers.

50. An alkaline storage battery as recited in claim 49 wherein the fabric has a mixing ratio of 3 to 25 parts by weight of bonding fibers to 100 parts by weight of composite segmented fibers.

51. An alkaline storage battery as recited in claim 50 wherein the fabric has a mixing ratio of 5 to 20 parts by weight of bonding fibers to 100 parts by weight of composite segmented fibers.

* * * * *